(12) United States Patent
Walker et al.

(10) Patent No.: US 7,717,784 B2
(45) Date of Patent: May 18, 2010

(54) METHOD AND APPARATUS FOR CONTROLLING THE PERFORMANCE OF A SUPPLEMENTARY PROCESS AT A POINT OF SALE TERMINAL

(75) Inventors: Jay S. Walker, Ridgefield, CT (US); Andrew S. Van Luchene, Norwalk, CT (US); Dean Alderucci, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/934,958

(22) Filed: Nov. 5, 2007

(65) Prior Publication Data

US 2008/0059319 A1      Mar. 6, 2008

Related U.S. Application Data

(60) Division of application No. 11/856,473, filed on Sep. 17, 2007, now abandoned, which is a continuation of application No. 09/045,386, filed on Mar. 20, 1998, now Pat. No. 7,272,569, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670, and a continuation-in-part of application No. 08/841,791, filed on May 5, 1997, now Pat. No. 5,926,796.

(51) Int. Cl.
*G06F 17/00* (2006.01)
*A63F 3/06* (2006.01)

(52) U.S. Cl. .................. 463/17; 463/25; 273/269; 705/24

(58) Field of Classification Search .......... 705/20, 705/24; 463/17, 25; 273/269
See application file for complete search history.

(56) References Cited

U.S. PATENT DOCUMENTS

| RE25,600 E | 6/1964 | Goldwater et al. ............. 178/4 |
| 3,222,189 A | 12/1965 | Perozzi ........................ 99/172 |
| 3,573,747 A | 4/1971 | Adams et al. |
| 3,637,999 A | 1/1972 | Pappas ..................... 235/94 A |
| 4,030,632 A | 6/1977 | Harashima .............. 221/150 A |

(Continued)

FOREIGN PATENT DOCUMENTS

DE       40 09 980 A1       1/1991

(Continued)

OTHER PUBLICATIONS

Myhre, James W., "Examiner Affidavit," Feb. 22, 2001.*

(Continued)

*Primary Examiner*—Andrew Joseph Rudy
(74) *Attorney, Agent, or Firm*—Fincham Downs LLC

(57) ABSTRACT

According to some embodiments of the present invention, methods and apparatus are described for performing a supplementary process. In one embodiment, a method is provided for receiving an override signal. If the override signal indicates performance of a supplementary process, the method further provides for determining an upsell in dependence on a purchase, determining an upsell price in dependence on the purchase, and offering to exchange the upsell price for the upsell.

9 Claims, 7 Drawing Sheets

| ACTIVITY RATE IDENTIFIER 122 | ACTIVITY RATE (% ALL POS TERMINALS IN USE) 124 | UPSELL TO OFFER 126 |
|---|---|---|
| A | LESS THAN 50% | ONE FROM A GROUP OF THREE ADDITIONAL PRODUCTS |
| B | BETWEEN 50% AND 80% | AN ADDITIONAL PRODUCT |
| C | BETWEEN 81% AND 90% | "TRIPLE-YOUR-CHANGE" COUPON |
| D | MORE THAN 90% | NONE |

U.S. PATENT DOCUMENTS

| | | | |
|---|---|---|---|
| 4,108,361 A | 8/1978 | Krause | |
| 4,120,452 A | 10/1978 | Kimura et al. | 235/381 |
| 4,323,770 A | 4/1982 | Dieulot et al. | |
| 4,441,160 A | 4/1984 | Azcua et al. | |
| 4,494,197 A | 1/1985 | Troy et al. | |
| 4,500,880 A | 2/1985 | Gomersall et al. | |
| 4,669,730 A | 6/1987 | Small | |
| 4,677,553 A | 6/1987 | Roberts et al. | |
| 4,689,742 A | 8/1987 | Troy et al. | |
| 4,723,212 A | 2/1988 | Mindrum et al. | |
| 4,760,247 A | 7/1988 | Keane et al. | |
| 4,764,666 A | 8/1988 | Bergeron | 235/380 |
| 4,815,741 A | 3/1989 | Small | |
| 4,825,045 A | 4/1989 | Humble | |
| 4,839,507 A | 6/1989 | May | |
| 4,854,590 A | 8/1989 | Jolliff et al. | |
| 4,859,838 A | 8/1989 | Okiharu | |
| 4,876,592 A | 10/1989 | Von Kohorn | |
| 4,882,473 A | 11/1989 | Bergeron et al. | |
| 4,902,880 A | 2/1990 | Garczynski et al. | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,973,952 A | 11/1990 | Malec et al. | |
| 4,982,337 A | 1/1991 | Burr et al. | |
| 4,993,714 A | 2/1991 | Golightly | |
| 5,025,372 A | 6/1991 | Burton et al. | |
| 5,053,957 A | 10/1991 | Suzuki | 364/405 |
| 5,056,019 A | 10/1991 | Schultz et al. | |
| 5,119,295 A | 6/1992 | Kapur | |
| 5,128,862 A | 7/1992 | Mueller | |
| 5,132,914 A | 7/1992 | Cahlander et al. | |
| 5,172,328 A | 12/1992 | Cahlander et al. | |
| 5,173,851 A | 12/1992 | Off et al. | |
| 5,177,342 A | 1/1993 | Adams | |
| 5,192,854 A | 3/1993 | Counts | |
| 5,193,056 A | 3/1993 | Boes | 705/36 |
| 5,200,889 A | 4/1993 | Mori | 364/401 |
| 5,201,010 A | 4/1993 | Deaton | |
| 5,216,595 A | 6/1993 | Protheroe | |
| 5,223,698 A | 6/1993 | Kapur | |
| 5,231,569 A | 7/1993 | Myatt et al. | |
| 5,235,509 A | 8/1993 | Mueller et al. | |
| 5,239,165 A | 8/1993 | Novak | |
| 5,243,515 A | 9/1993 | Lee | |
| 5,245,533 A | 9/1993 | Marshall | |
| 5,256,863 A | 10/1993 | Ferguson et al. | |
| 5,260,553 A | 11/1993 | Rockstein et al. | 235/462 |
| 5,262,941 A | 11/1993 | Saladin et al. | |
| 5,269,521 A | 12/1993 | Rossides | 273/138 R |
| 5,274,547 A | 12/1993 | Zoffel et al. | |
| 5,283,731 A | 2/1994 | Lalonde et al. | |
| 5,287,268 A | 2/1994 | McCarthy | |
| 5,297,026 A | 3/1994 | Hoffman | |
| 5,297,031 A | 3/1994 | Gutterman et al. | |
| 5,302,811 A | 4/1994 | Fukatsu | |
| 5,305,195 A | 4/1994 | Murphy | |
| 5,309,355 A | 5/1994 | Lockwood | |
| 5,327,508 A | 7/1994 | Deaton et al. | 382/7 |
| 5,353,218 A | 10/1994 | DeLapa et al. | |
| 5,353,219 A | 10/1994 | Mueller et al. | |
| 5,355,327 A | 10/1994 | Stent et al. | 364/551 |
| 5,371,345 A | 12/1994 | LeStrange et al. | 235/380 |
| 5,371,796 A | 12/1994 | Avarne | |
| 5,380,991 A | 1/1995 | Valencia et al. | |
| 5,398,932 A | 3/1995 | Eberhardt et al. | 273/138 A |
| RE34,915 E | 4/1995 | Nichtberger et al. | |
| 5,408,210 A | 4/1995 | Oka | 340/286 |
| 5,417,424 A | 5/1995 | Snowden et al. | 273/138 A |
| 5,420,606 A | 5/1995 | Begum et al. | |
| 5,428,606 A | 6/1995 | Moskowitz | |
| 5,440,108 A | 8/1995 | Tran et al. | 235/381 |
| 5,450,938 A | 9/1995 | Rademacher | 194/206 |
| 5,459,306 A | 10/1995 | Stein et al. | |
| 5,465,085 A | 11/1995 | Caldwell et al. | 340/825 |
| 5,481,094 A | 1/1996 | Suda | |
| 5,491,326 A | 2/1996 | Marceau et al. | 235/381 |
| 5,502,636 A | 3/1996 | Clarke | 364/401 |
| 5,504,475 A | 4/1996 | Houdou et al. | |
| 5,504,675 A | 4/1996 | Cragun et al. | 364/401 |
| 5,510,979 A | 4/1996 | Moderi et al. | |
| 5,521,364 A | 5/1996 | Kimura et al. | |
| 5,526,257 A | 6/1996 | Lerner | 364/401 |
| 5,528,490 A | 6/1996 | Hill | |
| 5,537,314 A | 7/1996 | Kanter | 705/14 |
| 5,539,189 A | 7/1996 | Wilson | |
| 5,544,040 A | 8/1996 | Gerbaulet | |
| 5,557,513 A | 9/1996 | Frey et al. | |
| 5,564,546 A | 10/1996 | Molbak et al. | |
| 5,572,653 A | 11/1996 | DeTemple et al. | |
| 5,576,951 A | 11/1996 | Lockwood | 395/227 |
| 5,581,064 A | 12/1996 | Riley et al. | |
| 5,583,763 A | 12/1996 | Atcheson et al. | 364/551.01 |
| 5,592,375 A | 1/1997 | Salmon et al. | |
| 5,592,376 A | 1/1997 | Hodroff | |
| 5,592,560 A | 1/1997 | Deaton et al. | 382/100 |
| 5,602,377 A | 2/1997 | Beller et al. | |
| 5,604,343 A | 2/1997 | Curry et al. | |
| 5,611,052 A | 3/1997 | Dykstra et al. | |
| 5,612,868 A | 3/1997 | Off et al. | |
| 5,615,269 A | 3/1997 | Micali | |
| 5,619,558 A | 4/1997 | Jheeta | |
| 5,620,079 A | 4/1997 | Molbak | |
| 5,620,182 A | 4/1997 | Rossides | 273/138.2 |
| 5,621,201 A | 4/1997 | Langhans et al. | |
| 5,621,640 A | 4/1997 | Burke | |
| 5,621,812 A | 4/1997 | Deaton et al. | |
| 5,630,103 A | 5/1997 | Smith et al. | |
| 5,632,010 A | 5/1997 | Briechle et al. | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAllister | |
| 5,664,115 A | 9/1997 | Fraser | |
| 5,665,953 A | 9/1997 | Mazzamuto et al. | |
| 5,687,322 A | 11/1997 | Deaton et al. | 395/214 |
| 5,694,546 A | 12/1997 | Reisman | |
| 5,710,887 A | 1/1998 | Chelliah et al. | 395/226 |
| 5,717,866 A | 2/1998 | Naftzger | 395/214 |
| 5,724,886 A | 3/1998 | Ewald et al. | |
| 5,759,101 A | 6/1998 | Von Kohorn | |
| 5,772,510 A | 6/1998 | Roberts | 463/17 |
| 5,774,868 A | 6/1998 | Cragun et al. | 705/10 |
| 5,794,210 A | 8/1998 | Goldhaber et al. | |
| 5,806,045 A | 9/1998 | Biorge et al. | 705/14 |
| 5,822,735 A | 10/1998 | DeLapa et al. | 705/14 |
| 5,832,457 A | 11/1998 | O'Brien et al. | |
| 5,845,259 A | 12/1998 | West et al. | |
| 5,845,263 A | 12/1998 | Camaisa et al. | 705/27 |
| 5,845,276 A | 12/1998 | Emerson et al. | 707/2 |
| 5,857,175 A | 1/1999 | Day et al. | |
| 5,869,826 A | 2/1999 | Eleftheriou | 235/380 |
| 5,880,449 A | 3/1999 | Teicher et al. | 235/383 |
| 5,884,272 A | 3/1999 | Walker et al. | 705/1 |
| 5,890,718 A | 4/1999 | Byon | |
| 5,918,209 A | 6/1999 | Campbell et al. | 705/27 |
| 5,923,016 A | 7/1999 | Fredregill et al. | 235/380 |
| 5,924,077 A | 7/1999 | Beach et al. | 705/10 |
| 5,926,796 A | 7/1999 | Walker et al. | |
| 5,930,771 A | 7/1999 | Stapp | 705/28 |

| | | | |
|---|---|---|---|
| 5,946,665 A | 8/1999 | Suzuki et al. | |
| 5,966,695 A | 10/1999 | Melchione et al. | 705/10 |
| 5,974,399 A | 10/1999 | Giuliani et al. | 705/14 |
| 5,999,914 A | 12/1999 | Blinn et al. | 705/26 |
| 6,014,634 A | 1/2000 | Scroggie et al. | |
| 6,014,641 A | 1/2000 | Loeb et al. | |
| 6,021,390 A | 2/2000 | Satoh et al. | |
| 6,024,288 A | 2/2000 | Gottlich et al. | |
| 6,029,139 A | 2/2000 | Cunningham et al. | 705/10 |
| 6,029,153 A | 2/2000 | Bauchner et al. | 705/42 |
| 6,039,244 A | 3/2000 | Finsterwald | 235/375 |
| 6,055,513 A | 4/2000 | Katz et al. | 705/26 |
| 6,061,660 A | 5/2000 | Eggleston et al. | 705/14 |
| 6,064,987 A | 5/2000 | Walker et al. | |
| 6,070,147 A | 5/2000 | Harms et al. | 705/14 |
| 6,080,062 A | 6/2000 | Olson | 463/42 |
| 6,085,164 A | 7/2000 | Smith et al. | 705/5 |
| 6,088,682 A | 7/2000 | Burke | 705/17 |
| 6,112,191 A | 8/2000 | Burke | 705/41 |
| 6,119,099 A | 9/2000 | Walker et al. | 705/16 |
| 6,131,399 A | 10/2000 | Hall | 62/127 |
| 6,138,105 A | 10/2000 | Walker et al. | |
| 6,164,533 A | 12/2000 | Barton | 705/35 |
| 6,223,163 B1 | 4/2001 | Van Luchene | |
| 6,229,879 B1 | 5/2001 | Walker et al. | |
| 6,253,188 B1 | 6/2001 | Witek et al. | 705/14 |
| 6,267,670 B1 | 7/2001 | Walker et al. | 463/17 |
| 6,292,786 B1 | 9/2001 | Deaton et al. | |
| 6,298,329 B1 | 10/2001 | Walker et al. | |
| 6,298,331 B1 | 10/2001 | Walker et al. | |
| 6,307,958 B1 | 10/2001 | Deaton et al. | |
| 6,321,210 B1 | 11/2001 | O'Brien et al. | |
| 6,397,193 B1 | 5/2002 | Walker et al. | |
| 6,463,585 B1 | 10/2002 | Hendricks et al. | 725/35 |
| 6,484,149 B1 | 11/2002 | Jammes et al. | 705/26 |
| 6,484,158 B1 | 11/2002 | Johnson et al. | 707/2 |
| 6,515,680 B1 | 2/2003 | Hendricks et al. | 345/716 |
| 6,582,304 B2 | 6/2003 | Walker et al. | 463/17 |
| 6,598,024 B1 | 7/2003 | Walker et al. | 705/16 |
| 2003/0037041 A1 | 2/2003 | Hertz | 707/1 |
| 2003/0120579 A1 | 6/2003 | Carter, III | 705/36 |
| 2003/0130904 A1 | 7/2003 | Katz et al. | 705/26 |

FOREIGN PATENT DOCUMENTS

| | | |
|---|---|---|
| EP | 0 085 546 A2 | 8/1983 |
| EP | 0 109 189 A1 | 10/1983 |
| EP | 512 413 A2 | 11/1992 |
| EP | 512413 | 11/1992 |
| EP | 0 780 788 A2 | 6/1997 |
| FR | 2 736 177 | 1/1997 |
| FR | 2 757 656 A 1 | 6/1998 |
| GB | 1 391 060 | 4/1975 |
| JP | 57086974 | 5/1982 |
| JP | 357086974 | 5/1982 |
| JP | 600251498 | 12/1985 |
| JP | 2171891 | 7/1990 |
| JP | 2197998 | 8/1990 |
| JP | 2278399 | 11/1990 |
| JP | HEI 2 1990 289000 | 11/1990 |
| JP | 040960900 | 2/1992 |
| JP | 4095198 | 3/1992 |
| JP | 4260914 | 9/1992 |
| JP | 04314189 | 11/1992 |
| JP | 5242363 | 9/1993 |
| JP | 07-231309 | 8/1995 |
| JP | 8147545 | 6/1996 |
| JP | 8329350 | 12/1996 |
| JP | 09300730 A | 11/1997 |
| JP | 10031792 | 2/1998 |
| JP | 11-505343 | 5/1999 |
| WO | WO 91/03789 | 3/1991 |
| WO | WO 96/34358 | 10/1996 |
| WO | WO 96/36926 | 11/1996 |
| WO | WO 97/28510 | 8/1997 |
| WO | WO 97/35441 A | 9/1997 |
| WO | WO 97/46961 | 12/1997 |
| WO | WO 97/50064 | 12/1997 |
| WO | WO 98/43149 | 10/1998 |
| WO | WO 99/11006 | 3/1999 |
| WO | WO 99/19809 | 4/1999 |
| WO | WO 99/46706 | 9/1999 |

OTHER PUBLICATIONS

"Cape Town", Reuters, Nov. 8, 1979, 1pg.
Greene, Jan, "Farm Bills Please Assns; National Grocers Association", Capital Cities Media, Inc., Dec. 23, 1985, vol. 35 at p. 6, ISSN: 0039-5803, 1pg.
"POS Spectrum: A Lottery Looks to POS for Growth", UMI, Inc.; Banking Information Source, POS News Jan. 1989,, vol. 5, No. 7, p. 8, 1pg.
"Winn-Dixie/The Salvation Army Report Contributions for War Against Hunger", PR Newswire Association, Inc., Jun. 10, 1993, 1pg.
Jones, Jeanne, "Date Readers Streamline Management: Scanner Technology Aids Retailers as Well as Plants, Wholesalers", The Houston Post, Jun. 26, 1994, 4pp.
Knippenberg, Jim, "Psst! Will Local Radio Empires Strike Back?", Copyright 1995, The Cincinnati Enquirer, Jul. 23, 1995, 1 pg.
Hadley, Kimberly, "Pastors Praying Anti-Arson Effort Will Burn Bias", Copyright 1996, Nashville Banner, 1 pg.
"Products and Services: Checkout Direct", Catalina Marketing Corporation, (http://catalinamktg.com/prodcdir.htm), download date: May 29, 1997, 12pp.
Riordan, Theresa, "Patents: A Novel Approach to Making A Better Spermicide Harks Back to Some Old-Fashioned Methods (subtitle: ", The New York Times, Jun. 9, 1997, Section D at p. 2, 3pp.
"Save the Mark", The Financial Times Limited, Feb. 1, 1983, 1pg.
Cook, Louise, "ConsumerWatch: Clip, Snip, Save", The Associated Press, Mar. 12, 1984, Business News Section, 2pp.
Kuttner, Robert, "Computers May Turn the World Into One Big Commodities Pit", Business Week, Sep. 11, 1989, Economic Viewpoint Section at p. 17, 2pp.
Schrage, Michael, "An Experiment in Economic Theory: Labs Testing Real Markets", The Record, Nov. 26,1989, Sunday, All Editions, Business Section at p. B1, 3pp.
Schwall, Benjamin, "Let's Play the Cash Register Receipts Lottery", New York Times Company, Dec. 25, 1990, Section 1, p. 30, Col. 4, Editorial Desk, 1pg.
Del Rosso, Laura, "Marketel Says it Plans to Launch Air Fare 'Auction' in Jun.", Travel Weekly, Apr. 29, 1991, vol. 50, No. 34 at p. 1, 4pp.
Author Unknown, "Philips Offers Customers Financing Through Citicorp; Philips Medical Systems North America, Citicorp North America, Inc.", Health Industry Today, Jun. 1991, vol. 54, No. 6; ISSN: 0745-4678 at p. 4, 1pg.
Pelline, Jeff, "Travelers Bidding on Airline Tickets, SF Firm Offers Chance for Cut-rate Fares", The San Francisco Chronicle, Aug. 19, 1991, Monday Final Edition at p. A4, 3pp.
Del Rosso, Laura, "Ticket-bidding Firm Closes Its Doors; Marketel International; Brief Article", Travel Weekly, Mar. 12, 1992, vol. 51; No. 21; ISSN: 0041-2082 at p. 1, 2pp.
Information Access Company, A Thompson Corporation Company ASAP, "Coupons Get Serious; Supermarkets Use Barcodes to Prevent Misredemptions", Chain Store Executive with Shopping Center Age, vol. 68 at p. 68, Copyright 1992, 2pp.
Fiorini, Phillip, "No Place for Penny? Smallest Coin Doesn't Make Cents to Some", USA Today, Jul. 1994, Final Edition at p. 1A, 3pp.
Smith, Alison, "Survey of UK Consumer Credit and Asset Finance", Financial Times, Nov. 3, 1994 at p. V1, 3pp.
Andreoli, Tom; Bordon, Jeff; Healy, Beth; Strahler, Steven R., and Veverka, Mark, "Cash Machines Offer A Whole Lotto Money for Withdrawal; An Unfortunate Juxtaposition; Block That Metaphor!, Something Street Talk; Fishy in Springfield; State Street Sears?; Champion as Underdog; A 'Whole Language' Graduate", Crain's Chicago Business, Jun. 19, 1995, News Section at p. 8, 2pp.

"Spain: BBV Launches New Card", Cards International, Jun. 22, 1995 at p. 5, 1pg.

Brochure: "Cyber Bid", Net Fun, Ltd., Copyright 1996 and 1995, 6pp.

Gapper, John, "NatWest Reports Rise in Bad Debt", Financial Times, Jul. 31, 1996, London Edition 3, News: UK Section at p. 9, 1 pg.

Author Unknown, "Lynx Technology: Lynx to Provide Business Leasing Programme Through Schroder Leasing", M2 Presswire, Aug. 9, 1996, 2pp.

Taylor, Paul, "Towards a Dream Market", Financial Times (London) Sep. 4, 1996 at p. 3, 2pp.

Bonnici, Joseph; Campbell, David P.; Fredenberger, William B.; and Hunnicutt, Kathryn, H., "Consumer Issues in Coupon Usage: An Exploratory Analysis", Journal of Applied Business Research, Winter 1996/1997, 11pp.

Rehayem, Gilbert, "Opinion: X-Press Betting", LaFleur's Lottery World, 1pg.

Singletary, Michelle, "Electronic World, Unchecked Problem? U.S. Move to Paperless Payment Raises Worries About Those Who Don't Use Banks", The Washington Post, Mar. 4, 1997, Final Edition Financial Section at p. C01, 2pp.

Avco Financial Services, "National Home Furnishing Association", (http://www.homefurnish.com/NHFA/avco.htm), download date: May 23, 1997, 2pp.

Nairn, Geoff, "The Key To Your Identity: Falling Costs Will Allow Fingerprint Verification to be Widely Used, Reports Geoff Nairn", Financial Times (London), Jul. 15, 1997, Technology Section at p. 12, 3pp.

The United Computer Exchange, "How It All Works", The United Computer Exchange Corporation, (http://www.uce.comhowitiworks.htm), download date: Jul. 23, 1997, 5pp.

"Classifieds2000: The Internet Classifieds", Classified2000, (http://www.classifieds2000.com/cgi-cls/Display.exe?C2K+aboutus), download date: Aug. 6, 1997, 3pp.

"General Trading Floor Information and Terms Provided by Tradingfloor.com", (http://tradingfloor.com/info.htm), download date: Aug. 14, 1997, 11pp.

"Nasdaq: What is Nasdq?" Information Sheet, (http://home.axford.com/corfin/corf11.htm) , download date: Aug. 15, 1997, 3pp.

Siren Technologies, Inc., "Introducing the Digital MenuBoard", (www.sirentech.com), 4pp.

Olivetti, "For the Crew & The Customer, The Best Drive-Thru & Grill Service", Winter 1998, 2pp.

"Bigger Plans", Card Fax, Oct. 1996, Section: vol. 96, No. 178, p. 2, 1pg.

Symons, Allene, "Lucky, Say-On Debut Rewards Cards", Drug Store News, vol. 19, Issue 4 Feb. 17, 1997, p. 3, 2pp.

Quittner, Jeremy, "Ohio's Provident Brings Its Discounts Card to Fla.", The American Banker, vol. 162, Issue 28, Feb. 11, 1997, Section: Credit/Debit/ATMs, p. 11, 2pp.

McKeveny, Alexander, "Giving Them A Good Reason", Bank Marketing, Mar. 1997, Mar. 1997, Section: vol. 29, No. 3, pp. 37-40, ISSN: 0888-3149, CODEN:ERKCDK, 5pp.

Brochure: "Reaching Out in New Directions", First Data Corporation, Merchant Services, undated, 32pp.

"Major Appliances: Tappan Unveils Microwave Oven Featuring Preprogrammed Controls", HFD, Sep. 10, 1984, p. 103, 1pg.

Silverman, Gene, "Planning and Using Infomercial Campaigns Effectively", Direct Marketing, Sep. 1995, vol. 58, No. 5, p. 32, 4pp.

McKinney, Jeff, "Merchant Program Could Pay Off for Provident", The Cincinnati Enquirer, Mar. 24, 1996, Section: Financial, p. E02, 2pp.

Raab, David M., "Package Aids Catalog Management", DM News, Apr. 22, 1996, Section: Software Review, p. 14, 2pp.

Fickenscher, Lisa, "Amex to Start Free Rewards Program with Discounts on Merchandise", The American Banker, Oct. 18, 1996, Section: Credit/Debit/ATMs, p. 10, 2pp.

Fitzgerald, Kate, "Amex Program Moves Loyalty to Next Level: Custom Extras Find A Medium Customers Can't Ignore: Billing Statements", Advertising Age, Nov. 4, 1996, Section: News, p. 2, 2pp.

Fickenscher, Lisa, "Merchant: American Express Seeks to Mine Its Data on Cardholder Spending Patterns", The American Banker, Mar. 24, 1997, Section: Credit/Debit/ATMs, p. 20, 2pp.

"Dispensing the Future", Electronic Payments International, May 1997, Section: Feature, p. 12, 5pp.

"Industry Briefs", Card News, Jun. 9, 1997, Section: vol. 12, No. 11, 2pp.

Hoeschen, Brad, "Brookfield Square Hopes Mall Card Strikes a Chord", Business Journal-Milwaukee, Sep. 12, 1997, Section: vol. 14, No. 50, p. 19, 2pp.

Website: "NCR 7452 Workstation—Beyond Traditional POS", (http:www.ncr.com/product/retail/products/catalog/7452.shtm), download date: Sep. 23, 1997, 3pp.

"NCR 7453 PC-Based Point-of-Sale Solutions", 1998 NCR Corporation, 2pp.

Examiner's Affidavit for U.S. Appl. No. 09/045,518, dated Feb. 22, 2001, 2pp.

Herman, Ken, "Auchan Cashes in on Lottery", Houston Post, Jul. 1, 1992, Section A, p. 15, col. 5, 2pp.

The Economist, "Heads I Win, Tails You Lose, M. Rossides' Application of Fair Gambling to Grocery Check-Outs", Business; p. 74, Jun. 13, 1992, 2pp.

"Georgia Almanac", Georgia Almanac, Jan. 26, 1983, BC Cycle, Section: Regional News, 2pp.

Herman, Ken, "Lottery's Losers: Small Stores; Big Pots Bring Big Problems", Austin American-Statesman, Nov. 23, 1996, Section: News, 4pp.

Kelsey, John and Schneier, Bruce, "Conditional Purchase Orders", Fourth AMC Conference on Computer Communication Security, AMC Press, Apr. 1997, 8pp.

Prochaska-Cue, Kathy, "Acquiring Credit", (http://ianr.www.unl.edu/IANR/PUBS/NEBFACTS/NF91.2.htm), download date: Sep. 3, 1997, 4pp.

Website: "Welcome to OnSale",(http://onsale.com), download date: Sep. 8, 1997, 15pp.

Website: "IAO—Onsale—GSCI—Zauction—Cyberswap—Auction World", (http://www.iao.auction.com/about.htm), download date: Sep. 8, 1997, 10pp.

Kirk, Jim, "Digital Promotions Make a Quick Point—McDonald's Testing New Technology on Its Menus", Chicago Tribune, Dec. 26, 1997, 2pp.

"From Our Family to Yours . . . 5 Weeks of Coupon Values for a Valuable Customer", Wakefern Food Corporation, 1998, 1pg.

Brochure: "It's in The Bag. Introducing the Universal Holding Cabinet from Welbilt", Frymaster Corporation, 1998, 4pp.

"Progressive Introduces Kitchen Display System (KDS) For Restaurants", PR Newswire, Jan. 23,1998, Section: Financial News, 2pp.

Blair, Adam, "JICC Coupon Guide Recommends Upgrades at Front End", Supermarket News, Feb. 9, 1998, Section: p. 23, ISSN: 0039-5803, 2pp.

Livingston, Kimball, "In-Store Systems, VideOcart Redux", Retail Tech Magazine, Mar. 1998, pp. 29-30, 2pp.

Website: "Advanced Mechanics Internet Specials", (http://metroplexweb.com/advcpn2.htm), download date: Mar. 12, 1998, 4pp.

Website: "U.P.C. Coupon Code Guidelines Manual", Uniform Code Council, Inc., (http://www.uccouncil.org/d31-3.htm), download date: Mar. 12, 1998, 10pp.

"New Wave Marketing", Promotion Times—An SCA Quarterly Newsletter—First Quarter. Apr. 1998, 2pp.

Hamstra, Mark, "Segment Study: 'Made-for-You' Maneuvers Signal Shift in QSR Category", Nation's Restaurant News, Apr. 13, 1998, 6pp.

Fogarty, Rich, "POSitive Input: The McDonald's POS-3 System Newsletter from Olivetti Solutions/OLSY", McDonald's Spring/Summer Edition 1998, 8pp.

"Universal Holding Cabinet Rollout Program", H&K Dallas, Inc., Winter 1998, 6pp.

"The Northwest German State Lottery—Your Invitation to Play", (http://www.germanstatelottery.com.invitation.html), download date: May 14, 1999, 2pp.

"Official Lottery Rules", (http://www.gloeckle.com/dedingungen/main.html), download date: May 14, 1999, 5pp.

Website: "What Actually is the SKL?", (http://www.gloeckle.com/das_spiel/rechts.html), download date: May 14, 1999, 3 pp.

"Epson Partners With International Lottery & Totalizer Systems; Epson's New Acclaim Program Wins With the Gaming Market", Business Wire, Jun. 7, 1999, 2pp.

"The Change Game", Georgia State Lottery Ticket—Mega Millions Jackpot, Draw Date Aug. 8, 2002, 1pg.

"Georgia Lottery Corporation—Change Game", (http://www.Georgialottery.com/changegame.html), download date: Dec. 4, 2002, 3pp.

Website: "Michigan Lottery", (http://www.Michigan.gov/lottery/0,16077-110-812_21193_21321--00.html), download date: Dec. 4, 2002, 2pp.

Website: "The Change Game—Turning Loose Change into Lottery Dollars", (http://www.berschgaming.com/about_the_game.htm), download date: Dec. 4, 2002, 1 pg.

"Magazine Subscription Sales Center—Where Buying Subscriptions is Easy!", Customer Service Information, Interactive Magazine Sales, Inc., e-mail: aim@panix.com, 2pp.

Howland, Jennifer, "National Distribution: Scanning the Future", Folio: The Magazine for Magazine Management, Feb. 1985, Section: vol. 14, p. 69, ISSN: 0046-4333, 11pp.

Wood, Wally, "Circulation Marketing: Let Your Magazine Do the Selling", Folio: The Magazine for Magazine Management, Jun. 1985, vol. 14, p. 78, ISSN: 0046-4333, 10pp.

Reese, Diane, "Revitalizing Single-Copy Sales", Folio: The Magazine for Magazine Management, Feb. 1986, vol. 15, p. 84, ISSN: 0046-4333, 14 pp.

Joyce, Walter, "Muscular Merchandising: column", Folio: The Magazine for Magazine Management, Jun. 1986, vol. 15, p. 124, ISSN: 0046-4333, 5pp.

"Phoenix Papers to Sell Merchandise to Build Awareness", Editor & Publisher, Sep. 17, 1988, vol. 121, Issue 38, p. 23, ISSN: 0013-094X, 2pp.

Donaton, Scott, "Gift Subscriptions Find Retail Niche", Advertising Age, Jul. 16, 1990, Section: News at p. 37, 2pp.

Guy, Pat, "A Gift Off the Rack: Mag Subscription", USA Today, Dec. 19, 1990, Section: Money at p. 2B, 2pp.

Jaben, Jan, "Magazine Gift-giving Made Simple at Retail Outlets; Time Inc., Hearst, Meredith Test Subscriber Systems' Method of Selling Gift Subscriptions; News" Feb. 15, 1991, vol. 3, No. 2, p. 15, ISSN: 1043-8688, 3pp.

Horton, Liz, "Holiday Gift Subs Up, Some Due to Novel Promotions", Folio: The Magazine for Magazine Management, Feb. 1, 1992, Section: vol. 21, No. 2, p. 39, ISSN: 0046-4333, 1 pg.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333, 3pp.

Manly, Lorne, "A Newsstand for the Electronic Age", Folio: The Magazine for Magazine Management, Sep. 15, 1993, vol. 22, No. 16, p. 17, ISSN: 0046-4333, 3pp.

Hochwald, Lambeth, "Sub Sources that Break With Tradition", Folio: The Magazine for Magazine Management, May 1, 1994, vol. 23, Issue 8, pp. 46-48, ISSN: 0046-4333, 4pp.

Love, Barbara, "Selling Subscriptions at Newsstands", Folio: The Magazine for Magazine Management, Jun. 1, 1994, vol. 23, Issue 10, p. 10, ISSN: 0046-4333, 2pp.

"The Super Subs", Precision Marketing, Oct. 24, 1994, No. 0, vol. 0, p. 23, ISSN: 0957-4913, 5pp.

Cyr, Diane, "Distribution Woes; Declining Newsstand Circulation; Includes Related Article On Preventing Newsstand Fraud", Folio: The Magazine for Magazine Management, Jan. 1995, vol. 23, No. 19, p. 170, ISSN: 0046-4333, 5pp.

Love, Barbara, "Folio: Plus Circulation; Techniques for Managing Magazine Circulation", Folio: The Magazine for Magazine Management, Jan. 1995, vol. 23, No. 19, p. 159, ISSN: 0046-4333, 3pp.

Kelly, Keith J., "Hearst Opens a Cyberspace Newsstand", Advertising Age, Jan. 30, 1995, vol. 66, Issue 5, p. 14, ISSN: 0001-8899, 2pp.

Schnuer, Jenna, "Overnight Options Add to Distribution Mix; Distribution of "Inside Sports" Magazine", Folio: The Magazine for Magazine Management, Mar. 1, 1995, vol. 24, No. 4, p. 19, ISSN: 0046-4333, 2pp.

Kelly, Keith J., "Publishers Pine for Cyber-Profits", Time, Inc., Mar. 13, 1995, vol. 66, Issue 11, pp. S-22, ISSN: 0001-8899, 2pp.

"Hearst Corporation Launches 'The Multimedia Newsstand'", Link-Up, Mar./Apr. 1995, vol. 12, Issue 2, pp. 1 & 36, ISSN: 0739-988X, 3pp.

Wilson, Steve, "Out of Print—but Not Business; Magazines Move Away From Print in Favor of Electronic Publishing", Folio: The Magazine for Magazine Management, May 1, 1995, vol. 24, No. 8, p. 22, ISSN: 0046-4333, 2pp.

Hochwald, Lambeth, "Postal Blues: Circulators Cope With the Rate Crunch", Folio: The Magazine for Magazine Management, May 1, 1995, vol. 24, No. 8, p. 54, ISSN: 0046-4333, 3pp.

"Tretorn Offers Magazine Promo", AdWeek, May 1, 1995, Section: Newswire, 1pg.

"Lotto World", MediaWeek, May 8, 1995, vol. 5, No. 19 at p. 16, 1pg.

Graham, Anne, "Nonmember Subs—Or Not? Non-Member Subscriptions to Association Magazines; Includes Tips from Publishers", Folio: The Magazine for Magazine Management, Jun. 1, 1995, vol. 24, No. 10, p. 47, ISSN: 0046-4333, 4pp.

Miller, Paul, "Magazine Deal Lacks Catalog Appeal; Brief Article", Folio: The Magazine for Magazine Management, Jun. 15, 1995, vol. 24, No. 11, p. 30, ISSN: 0046-4333, 2pp.

Wilson, Steve, "Directory Assistance: A Buyer's Guide Can Give You a Big Boost in Revenue and Attract New Advertisers and Subscribers", Folio: The Magazine for Magazine Management, Oct. 1, 1995, vol. 24, No. 16, p. 40, ISSN: 0046-4333, 6pp.

Garratt, David, "What Premium on On-Cover Premiums?", Folio: The Magazine for Magazine Management, Oct. 1, 1995, vol. 24, No. 16, p. 53, ISSN: 0046-4333, 3pp.

"HFS Incorporates and Hatches Filipacchi Magazines; Announce Launch of Century 21 House & Home Magazine . . . ", Business Wire, Nov. 20, 1995, 2pp.

Hochwald, Lambeth, "Circulation Secrets: Nine Steps to a Successful Circulation Launch Strategy Includes List of Resources", Folio: The Magazine for Magazine Management, Feb. 1, 1996, vol. 25, No. 2, p. 53, ISSN: 0046-4333, 5pp.

Kerwin, Anne Marie, "Notably at the Newsstand: InStyle, Financial World Push for Greater Single-Copy Sales", Inside Media, Feb. 7, 1996, vol. 8, No. 3, p. 26, ISSN: 1046-5316, 2pp.

Adams, Mark, "Capell Reports Sales Drop at Newsstands", Mediaweek, Mar. 11, 1996, vol. 6, No. 11, p. 27, ISSN: 1055-176X, CODEN:MADEAP, 1pg.

Hodges, Jane, "WSJ Puts Squeeze on Web Subscriptions", Advertising Age, Apr. 29, 1996, vol. 67, Issue 18, p. 34, ISSN: 0001-8899, 2pp.

Schnuer, Jenna, "A World Without Magazines? Consumers Weigh In. Survey of Consumers Indicates That . . . ", Folio: The Magazine for Magazine Management, Jun. 1, 1996, vol. 25, No. 9, p. 16, ISSN: 0046-4333, 2pp.

Tedesco, Richard, "Time Launches 'Net Subscription Service'", Broadcasting & Cable, Nov. 11, 1996, vol. 126, Issue 47, p. 65, ISSN: 1068-6827, 2pp.

Case, Tony, "The Electronic Newsstand Branches Out", Folio: The Magazine for Magazine Management, Apr. 1, 1997, vol. 26, Issue 5, p. 13, ISSN: 0046-4333, 2pp.

Krol, Carol, "Magazine Site to Focus on Commerce", Advertising Age, Aug. 18, 1997, vol. 68, Issue 33, p. 18, ISSN: 0001-8899, 2pp.

Reilly, Brian, "Upselling' Strategies Hit the Net", Advertising Age's Business Marketing, Chicago, Dec. 1996, 1pg.

Forman, Preston P., "Vendors Practice What They Preach", Computer Reseller News, Manhasset, Mar. 2, 1998, 3pp.

Wingfield, Nick, "Priceline to Launch Online 'Yard Sales'", WSJ Interactive Edition (http://www.zdnet.com/filters/printerfriendly/0,6061,2413811-200.htm), 2pp.

PCT International Search Report for Application No. PCT/US98/05787, dated Apr. 27, 1999, 2pp.

Goodstein, Ronald C., "UPC Scanner Pricing Systems: Are They Accurate?", Journal of Marketing, Apr. 1994, vol. 58, No. 2, pp. 20-30, ISSN: 0022-2429, 17pp.

Stankevich, Debby Garbato, "Cook's Warehouse Sets Heavy-Gauge Nonstick", HFN, The Weekly Newspaper for the Home Furnishing Network, Aug. 14, 1995, Section: vol. 69, No. 33, p. 46, 2pp.

Rodwin, Marc A., "Consumer Protection and Managed Care: The Need for Organized Consumers", Health Affairs, Fall 1996, vol. 15, No. 3, pp. 110-123, ISSN: 0278-2715, CODEN: FRBPBN, 11pp.

Kennedy, Doug, "Train Front Desk Staff in Sales; Hotel Industry", Hotel & Motel Management, Mar. 3, 1997, Section: No. 4, vol. 212, p. 15, ISSN: 0018-6082, 3pp.

PCT International Search Report for International Application No. PCT/US98/17287, dated Apr. 16, 1999.

Webster's II, New Riverside University Dictionary, 1994, Houghton-Mifflin Company, pp. 450.

Now Abandoned U.S. Appl. No. 09/083,689, entitled "Method and System for Selling Supplemental Products at a Point-Of-Sale", filed May 21, 1998 in the name of Andrew S. Van Luchene, 50pp.

Pending U.S. Appl. No. 09/107,971, entitled, "Method and Apparatus for Facilitating the Play of Fractional Lottery Tickets Utilizing Point-of-Sale Terminals", filed Jun. 30,1998, in the name of Andrew S. Van Luchene, 47pp.

Lang, Joan, "Round n' Round They Go", May 1, 1996, Restaurant Business, vol. 96, No. 7, pp. 132-134, 2pp.

PCT Written Opinion for Application No. PCT/US98/05787, dated Jul. 29, 1999, 11pp.

PCT International Search Report for Application No. PCT/US/05787, dated May 12,1999, 2pp.

Wyatt, Craig, "Usage Models Just for Merchants", Credit Card Management, vol. 8, No. 6, pp. 32-38, Sep. 1995, 4 pp.

PCT International Search Report for Application No. PCT/US01/09045, dated Oct. 10, 2001, 5pp.

Glickman, Jeff, "10 Infomercial Facts You Need to Know"(Supplement: The Infomercial—Special Sourcebook Issue), Adweek Eastern Edition, vol. 34, No. 10, Mar. 8, 1993, p. S28, 6pp.

Office Action for U.S. Appl. No. 08/920,116, dated Oct. 1, 1999, 8pp.

Office Action for U.S. Appl. No. 08/920,116, dated Oct. 25, 1999, 6pp.

Office Action for U.S. Appl. No. 09/442,754, dated Aug. 2, 2000, 11pp.

Office Action for U.S. Appl. No. 09/442,754, dated Jan. 16, 2001, 11pp.

Office Action for U.S. Appl. No. 09/442,754, dated Aug. 1, 2001, 6pp.

Notice of Allowability for U.S. Appl. No. 09/442,754, dated Dec. 7, 2001, 4pp.

Office Action for U.S. Appl. No. 09/442,754, dated Jan. 7, 2003, 7pp.

Supplemental Allowance for U.S. Appl. No. 09/442,754, dated Mar. 4, 2003, 5pp.

Office Action for U.S. Appl. No. 10/625,089, dated Apr. 5, 2006, 7pp.

Office Action for U.S. Appl. No. 10/625,089, dated Sep. 10, 2007, 11pp.

Office Action for U.S. Appl. No. 09/045,386, dated Aug. 15, 2000, 12pp.

Office Action for U.S. Appl. No. 09/045,386, dated Mar. 14, 2001, 13pp.

Office Action for U.S. Appl. No. 09/045,386, dated Oct. 11, 2001, 5pp.

Office Action for U.S. Appl. No. 09/045,386, dated Jan. 25, 2002, 3pp.

Office Action for U.S. Appl. No. 09/045,386, dated Jul. 1, 2002, 6pp.

Office Action for U.S. Appl. No. 09/045,386, dated Mar. 7, 2003, 7pp.

Office Action for U.S. Appl. No. 09/045,386, dated Nov. 23, 2004, 6pp.

Supplemental Notice of Allowability for U.S. Appl. No. 09/045,386, dated Mar. 20, 2006, 3pp.

Office Action for U.S. Appl. No. 09/045,347, dated May 6, 1999, 6pp.

Office Action for U.S. Appl. No. 09/045,347, dated Jan. 11, 2000, 7pp.

Office Action for U.S. Appl. No. 09/045,347, dated Sep, 22, 2000, 8pp.

Office Action for U.S. Appl. No. 09/045,347, dated Apr. 10, 2001, 2pp.

Office Action (Restriction) for U.S. Appl. No. 09/933,588, dated Aug. 28, 2006, 7pp.

Office Action for U.S. Appl. No. 09/933,588, dated Aug. 21, 2001, dated Jan. 3, 2007, 10pp.

Office Action for U.S. Appl. No. 09/083,689, dated Jun. 23, 1999, 11pp.

Office Action for U.S. Appl. No. 09/083,689, dated Jan. 31, 2000, 2pp.

Office Action for U.S. Appl. No. 09/083,689, dated Aug. 2, 2000, 19pp.

Office Action for U.S. Appl. No. 09/083,689, dated Jan. 16, 2001, 9pp.

Office Action for U.S. Appl. No. 09/083,689, dated Jul. 25, 2001, 9pp.

Office Action for U.S. Appl. No. 09/083,689, dated Mar. 18, 2002, 14pp.

Office Action for U.S. Appl. No. 09/045,518, dated Jun. 6, 2000, 9pp.

Interview Summary for U.S. Appl. No. 09/045,518, dated Nov. 14, 2000, 2pp.

Office Action for U.S. Appl. No. 09/045,518, dated Feb. 13, 2001, 14pp.

Office Action for U.S. Appl. No. 09/045,518, dated Jul. 2, 2001, 12pp.

Office Action for U.S. Appl. No. 09/045,518, dated Feb. 12, 2002, 2pp.

Office Action for U.S. Appl. No. 09/045,518, dated Apr. 5, 2002, 16pp.

Office Action for U.S. Appl. No. 09/045,518, dated Jun. 13, 2003, 19pp.

Decision on Appeal for U.S. Appl. No. 09/045,518, dated May, 6, 2004, 63pp.

Interview Summary for U.S. Appl. No. 09/045,518, dated Jan. 31, 2005, 7pp.

Notice of Allowability for U.S. Appl. No. 09/045,518, dated Feb. 3, 2005, 6pp.

Office Action for U.S. Appl. No. 11/160,499, dated Mar. 15, 2006, 6pp.

Office Action for U.S. Appl. No. 11/160,499, dated Nov. 30, 2006, 3pp.

Office Action for U.S. Appl. No. 09/076,409, dated Apr. 13, 1999, 5pp.

Office Action for U.S. Appl. No. 09/076,409, dated Jan. 5, 2000, 6pp.

Notice of Allowability for U.S. Appl. No. 09/076,409, dated Mar. 27, 2001, 6pp.

Office Action for U.S. Appl. No. 09/643,668, dated Dec. 23, 2002, 12pp.

Notice of Allowability for U.S. Appl. No. 09/643,668, dated Aug. 9, 2004, 4pp.

Office Action for U.S. Appl. No. 11/099,287, dated Jul. 12, 2006, 7pp.

Office Action for U.S. Appl. No. 11/099,287, dated Apr. 6, 2007, 10pp.

Office Action for U.S. Appl. No. 09/045,084, dated Apr. 3, 2000, 10pp.

Notice of Allowability for U.S. Appl. No. 09/045,084, dated Nov. 6, 2000, 4pp.

Office Action for U.S. Appl. No. 09/777,297, dated Jul. 8, 2004, 5pp.

Office Action for U.S. Appl. No. 09/083,483, dated Feb. 22, 2000, 8pp.

Office Action for U.S. Appl. No. 09/083,483, dated Nov. 22, 2000, 7pp.

Interview Summary for U.S. Appl. No. 09/083,483, Jan. 29, 2001, 4pp.

Interview Summary for U.S. Appl. No. 09/083,483, Feb. 9, 2001, 1pg.

Notice of Allowability for U.S. Appl. No. 09/083,483, Feb. 12, 2001, 3pp.

Office Action for U.S. Appl. No. 09/858,458, dated Jan. 26, 2005, 21pp.

Office Action for U.S. Appl. No. 09/858,458, dated Jun. 29, 2005, 9pp.

Office Action for U.S. Appl. No. 09/858,458, dated Mar. 24, 2006, 10pp.

Interview Summary for U.S. Appl. No. 09/858,458, dated Aug. 9, 2006, 2pp.

Office Action for U.S. Appl. No. 09/603,677, dated Mar. 11, 2003, 8pp.
Office Action for U.S. Appl. No. 09/603,677, dated Dec. 12, 2003, 38pp.
Office Action for U.S. Appl. No. 09/603,677, dated Apr. 6, 2004, 2pp.
Office Action for U.S. Appl. No. 09/603,677, dated Aug. 11, 2004, 30pp.
Office Action for U.S. Appl. No. 09/603,677, dated Dec. 14, 2004, 22pp.
Office Action for U.S. Appl. No. 09/603,677, dated Mar. 22, 2007, 22pp.
Office Action for U.S. Appl. No. 09/603,677, dated Aug. 29, 2007, 2pp.
Office Action for U.S. Appl. No. 09/045,036, dated Dec. 11, 2007, 9pp.
Office Action for U.S. Appl. No. 10/678,056, dated Oct. 30, 2007, 5pp.
Office Action for U.S. Appl. No. 11/160,499, dated Nov. 15, 2007, 9pp.
Office Action for U.S. Appl. No. 11/099,287, dated Jan. 10, 2008, 9pp.
Office Action for U.S. Appl. No. 09/933,588 dated Apr. 7, 2009, 9pp.
Office Action for U.S. Appl. No. 11/099,287 dated Jul. 6, 2009, 22 pp.
Office Action for U.S. Appl. No. 11/099,287 dated Oct. 28, 2008, 18 pp.
Office Action for U.S. Appl. No. 11/621,422 dated Jul. 20, 2009, 14 pp.
Notice of Allowance for U.S. Appl. No. 10/625,089 dated Oct. 6, 2008, 9 pp.
Notice of Allowance for U.S. Appl. No. 10/625,089 dated Apr. 2, 2008, 9 pp.
Office Action for U.S. Appl. No. 10/625,089 dated Sep. 10, 2007, 11 pp.
Office Action for U.S. Appl. No. 10/625,089 dated Oct. 24, 2005, 7 pp.
Supplemental Notice of Allowability for U.S. Appl. No. 10/457,101 dated Dec. 11, 2007, 4 pp.
Office Action for U.S. Appl. No. 10/457,101 dated May 25, 2007, 13 pp.
Office Action for U.S. Appl. No. 10/457,101 dated Oct. 20, 2006, 12 pp.
Office Action for U.S. Appl. No. 11/456,276 dated May 28, 2009, 9 pp.
Office Action for U.S. Appl. No. 11/456,276 dated Aug. 20, 2008, 7 pp.
Office Action for U.S. Appl. No. 11/456,276 dated Dec. 31, 2007, 10 pp.
Office Action for U.S. Appl. No. 11/456,271 dated May 29, 2009, 11 pp.
Office Action for U.S. Appl. No. 11/456,271 dated Aug. 19, 2008, 8 pp.
Office Action for U.S. Appl. No. 11/456,271 dated Dec. 31, 2007, 10 pp.
Notice of Allowance for U.S. Appl. No. 08/822,709 dated Jan. 16, 2001, 3 pp.
Office Action for U.S. Appl. No. 08/822,709 dated Feb. 17, 2000, 6 pp.
Notice of Allowance for U.S. Appl. No. 09/836,409 dated Jan. 13, 2003, 4 pp.
Office Action for U.S. Appl. No. 09/836,409 dated Nov. 20, 2002, 4 pp.
Notice of Allowance for U.S. Appl. No. 09/836,409 dated Sep. 25, 2002, 4 pp.
Notice of Allowance for U.S. Appl. No. 09/836,409 dated May 16, 2002, 4 pp.
Office Action for U.S. Appl. No. 09/836,409 dated Oct. 1, 2001, 6 pp.
Notice of Allowance for U.S. Appl. No. 10/424,362 dated Nov. 4, 2004, 7 pp.
Office Action for U.S. Appl. No. 10/424,362 dated Jun. 9, 2004, 6 pp.
Office Action for U.S. Appl. No. 10/424,362 dated Nov. 19, 2003, 10 pp.
Notice of Allowance for U.S. Appl. No. 11/058,653 dated Jul. 22, 2008, 4 pp.
Notice of Allowance for U.S. Appl. No. 11/058,653 dated Mar. 4, 2008, 7 pp.
Office Action for U.S. Appl. No. 11/058,653 dated May 15, 2007, 5 pp.
Notice of Allowance for U.S. Appl. No. 11/058,653 dated Jul. 22, 2008, 7 pp.
Notice of Allowance for U.S. Appl. No. 11/425,211 dated Feb. 9, 2009, 8 pp.
Office Action for U.S. Appl. No. 11/425,211 dated Mar. 26, 2008, 5 pp.
Notice of Allowance for U.S. Appl. No. 11/425,228 dated Oct. 8, 2008, 6 pp.
Office Action for U.S. Appl. No. 11/425,228 dated May 12, 2008, 7 pp.
Office Action for U.S. Appl. No. 11/425,228 dated Jul. 25, 2007, 6 pp.
Office Action for U.S. Appl. No. 11/425,232 dated Mar. 18, 2008, 5 pp.
Notice of Acceptance for Canadian Application No. 2,284,662 dated Oct. 3, 2003, 1 pg.
Office Action for Canadian Application No. 2,284,662 mailed Jan. 29, 2003, 3 pp.
Office Action for European Application No. 98 013 082 mailed Jul. 24, 2006, 5 pp.
Translation of Office Action for Japanese Application No. 545921/98, mailed Feb. 18, 2003, 4 pp.
Translation of Office Action for Japanese Application No. 545921/98, mailed Jun. 13, 2006, 8 pp.
International Search Report for Application No. PCT/US98/17287 dated Apr. 16, 1999, 2 pp.
Written Opinion for Application No. PCT/US98/17287 dated Sep. 13, 1999, 5 pp.
International Search Report for PCT/US98/16985, mailed Apr. 12, 2002, 3 pp.
Office Action for Application No. PCT/US98/17274 dated Sep. 30, 2002, 2 pp.
Office Action for Application No. 2000-508047 dated Apr. 2, 2002, 8 pp.
Office Action for Application No. 2299341 dated Dec. 17, 2001, 2 pp.
Office Action for Application No. 2299341 dated Feb. 3, 2004, 7 pp.
International Search Report for Application No. PCT/US98/17274 dated Arp. 12, 1999, 4 pp.
Written Opinion for Application No. PCT/US98/17274 dated Feb. 23, 2000, 7 pp.
International Preliminary Examination Report for PCT/US98/17274 dated Jun. 22, 2000, 8 pp.
International Preliminary Examination Report for PCT/US01/09045 dated Sep. 18, 2002, 3 pp.
"Sharing the winnings", Boston Globe, Apr. 2, 1995, 1 pg.
Downing, Neil, "Money Line: IF 12 people share a winning ticket, they'll have to share a single check", Providence Journal—Bulletin, Oct. 17, 1995, 3 pp.
Notice of Allowance for U.S. Appl. No. 11/621,422 mailed Dec. 28, 2009, 9 pp.
Office Action for U.S. Appl. No. 11/456,276 mailed Jan. 13, 2010, 13 pp.

* cited by examiner

| ACTIVITY RATE IDENTIFIER 62 | ACTIVITY RATE (TRANSACTIONS PER 15 MINUTE PERIOD) 64 | UPSELL TO OFFER 66 |
|---|---|---|
| A | LESS THAN 8 | AN ADDITIONAL PRODUCT |
| B | BETWEEN 8 AND 15 | "TRIPLE-YOUR-CHANGE" COUPON |
| C | MORE THAN 15 | NONE |

FIG. 4

| ACTIVITY RATE IDENTIFIER 122 | ACTIVITY RATE (% ALL POS TERMINALS IN USE) 124 | UPSELL TO OFFER 126 |
|---|---|---|
| A | LESS THAN 50% | ONE FROM A GROUP OF THREE ADDITIONAL PRODUCTS |
| B | BETWEEN 50% AND 80% | AN ADDITIONAL PRODUCT |
| C | BETWEEN 81% AND 90% | "TRIPLE-YOUR-CHANGE" COUPON |
| D | MORE THAN 90% | NONE |

METHOD AND APPARATUS FOR CONTROLLING THE PERFORMANCE OF A SUPPLEMENTARY PROCESS AT A POINT OF SALE TERMINAL

CROSS-REFERENCE TO RELATED APPLICATIONS

The present application is a divisional of U.S. patent application Ser. No. 11/856,473 entitled METHOD AND APPARATUS FOR CONTROLLING THE PERFORMANCE OF A SUPPLEMENTARY PROCESS AT A POINT-OF-SALE TERMINAL, filed Sep. 17, 2007 now abandoned; which is a continuation of U.S. patent application Ser. No. 09/045,386, entitled METHOD AND APPARATUS FOR CONTROLLING THE PERFORMANCE OF A SUPPLEMENTARY PROCESS AT A POINT-OF-SALE TERMINAL, filed Mar. 20, 1998 now U.S. Pat. No. 7,272,569; which is a continuation-in-part of (i) U.S. patent application Ser. No. 08/920,116, entitled METHOD AND SYSTEM FOR PROCESSING SUPPLEMENTARY PRODUCT SALES AT A POINT-OF-SALE TERMINAL, filed Aug. 26, 1997 and issued as U.S. Pat. No. 6,119,099 on Sep. 12, 2000, which is a continuation-in-part of U.S. patent application Ser. No. 08/822,709, entitled SYSTEM AND METHOD FOR PERFORMING LOTTERY TICKET TRANSACTIONS UTILIZING POINT-OF-SALE TERMINALS, filed Mar. 21, 1997 and issued as U.S. Pat. No. 6,267,670 on Jul. 31, 2001; and (ii) U.S. patent application Ser. No. 08/841,791, entitled METHOD AND APPARATUS FOR SELLING SUBSCRIPTIONS TO PERIODICALS IN A RETAIL ENVIRONMENT, filed May 5, 1997 and issued as U.S. Pat. No. 5,926,796 on Jul. 20, 1999, each of which are incorporated by reference in their entirety.

The present application is also related to the following United Sstates Patent Applications: U.S. patent application Ser. No. 09/045,036, entitled METHOD AND APPARATUS FOR FACILITATING THE PLAY OF FRACTIONAL LOTTERY TICKETS UTILIZING POINT-OF-SALE TERMINALS, filed Mar. 20, 1998; U.S. patent application Ser. No. 09/045,518, entitled METHOD AND APPARATUS FOR PROCESSING A SUPPLEMENTARY PRODUCT AT A POINT-OF-SALE TERMINAL, filed Mar. 20, 1998 and issued as U.S. Pat. No. 7,072,850 on Jul. 4, 2006; U.S. patent application Ser. No. 09/045,084, entitled METHOD AND APPARATUS FOR CONTROLLING OFFERS THAT ARE PROVIDED AT A POINT-OF-SALE TERMINAL, filed Mar. 20, 1998 and issued as U.S. Pat. No. 6,223,163 on Apr. 24, 2001; and U.S. patent application Ser. No. 09/045,347, entitled METHOD AND APPARATUS FOR PROCESSING A SUPPLEMENTARY PRODUCT SALE AT A POINT-OF-SALE TERMINAL, filed Mar. 20, 1998 and now abandoned, each of which are incorporated by reference in their entirety.

FIELD OF THE INVENTION

The present invention relates to point-of-sale terminals, and, more specifically, to methods and apparatus for controlling the performance of supplementary processes at point-of-sale terminals.

BACKGROUND OF THE INVENTION

Point-of-sale ("POS") terminals, such as cash registers, are used in a wide variety of businesses for performing such processes as calculating the total price of a purchase (goods or services) and calculating the amount of change due to a customer. Some POS terminals furthermore track items sold and adjust a database of store inventory accordingly.

A POS terminal may perform a supplementary process in addition to performing the processes listed above. A supplementary process can increase sales, and thereby increase the average profit gained per transaction. One such supplementary process is described in a parent application of the present application, U.S. patent application Ser. No. 08/920,116, entitled METHOD AND SYSTEM FOR PROCESSING SUPPLEMENTARY PRODUCT SALES AT A POINT-OF-SALE TERMINAL, filed Aug. 26, 1997 and issued as U.S. Pat. No. 6,119,099 on Sep. 12, 2000. Described therein is a supplementary process in which a customer at a POS terminal is offered an "upsell" in exchange for an amount of change due. The POS terminal determines an upsell in dependence on a purchase of the customer, and also determines an upsell price (the amount of change due) based on the purchase. For example, a customer purchasing a first product for $1.74 and tendering $2.00 may be offered a second product in lieu of the $0.26 change due. The upsell price, $0.26, thus depends on the purchase price $1.74.

Another supplementary process is a computer-determined "suggestive sell". U.S. Pat. No. 5,353,219 describes a system for suggesting items for a customer to purchase from a primary category at conventional item prices. Still another supplementary process is described in a parent application of the present application, U.S. patent application Ser. No. 08/841,791, entitled METHOD AND APPARATUS FOR SELLING SUBSCRIPTIONS TO PERIODICALS IN A RETAIL ENVIRONMENT, filed May 5, 1997 and issued as U.S. Pat. No. 5,926,796 on Jul. 20, 1999. Described therein is a supplementary process in which a customer purchasing an issue of a periodical at a POS terminal is offered the opportunity at that time to purchase a subscription to that periodical.

Such supplementary processes may be performed solely within the POS terminal itself. For example, a cash register may be programmed to calculate an amount of change due, and determine an upsell to offer in exchange for the change due. Alternatively, the supplementary process may be performed with the assistance of a device in communication with the cash register. For example, a remote server computer connected to the cash register via a communications network may determine an upsell to offer in exchange for the change due.

A supplementary process performed at a POS terminal may undesirably slow the rate at which customer transactions are completed. For example, it may take several seconds for a cashier operating a POS terminal to offer a customer an upsell in exchange for an amount of change due, and for the customer to decide whether to accept such an offer. Offering a customer a choice of several upsells in exchange for an amount of change due could impose yet further delays on completing customer transactions.

Such delays may be acceptable under some conditions, yet unduly burdensome under other conditions. For example, during lunch or other times of day, there may be a long line at a POS terminal. It would be inadvisable to add to the wait of each customer in line by performing a supplementary process as well. However, eliminating the supplementary processes may speed the completion of customer transactions, but at the cost of the extra profit derived from such supplementary processes. Accordingly, a need exists for controlling the performance of supplementary processes at POS terminals.

SUMMARY OF THE INVENTION

It is an object of the present invention to provide a method and apparatus for controlling the performance of a supplementary process at a point-of-sale terminal.

In accordance with the present invention, one or more POS terminals measure one or more criteria, such as the activity rate of the POS terminal. For example, the POS terminal may measure the number of completed transactions per period of time, the number of items purchased through the POS terminal per period of time, the number of upsells accepted by customers per period of time, the number of customers in a store or the number of customers in the vicinity of the POS terminal. The POS terminal in turn compares the measured criteria with a predetermined threshold. Based on the results of the comparison, the POS terminal determines whether to perform a supplementary process. For example, the POS terminal may perform the supplementary process only if the number of transactions per minute is less than a predetermined threshold.

BRIEF DESCRIPTION OF THE DRAWINGS

FIG. 4 is a table illustrating an offer schedule that depends on an activity rate of a POS terminal.

FIG. 7 is a table illustrating an offer schedule that depends on an activity rate of a plurality of POS terminals.

DETAILED DESCRIPTION OF THE PREFERRED EMBODIMENTS

Applicants have recognized that supplementary processes performed by POS terminals may introduce delays in the completion of customer transactions, and that these delays may be acceptable under certain circumstances. For example, when there are few pending customer transactions, such delays do not significantly affect relevant measures of performance such as sales per hour or profit per hour.

Accordingly, performing supplementary processes during periods of low activity, yet reducing or refraining from supplementary processes during periods of high activity, can result in increased profit. Such increased profit can exceed the profit of POS terminals that either always perform the supplemental process or never perform the supplemental process.

In one embodiment of the present invention, a POS terminal measures one or more criteria, such as an activity rate of a terminal, and performs a supplementary process if the criteria are less than predetermined thresholds. In another embodiment, a POS terminal measures an activity rate of a terminal, determines an offer schedule in accordance with the activity rate, and in turn provides a supplementary product offer in accordance with the offer schedule. The offer schedule may specify that time-consuming offers (offers with a low "offer speed") are made during periods of low terminal activity, while quicker offers (offers with a high "offer speed") are made during periods of higher terminal activity.

It is particularly desirable to provide an offer to exchange spare change due for an upsell, as described in the aforementioned parent application, application Ser. No. 08/920,116. Accordingly, the present invention contemplates providing offers for upsells having high performance rates. In addition, the present invention contemplates providing offers for different upsells in accordance with an offer schedule.

Figure 1:
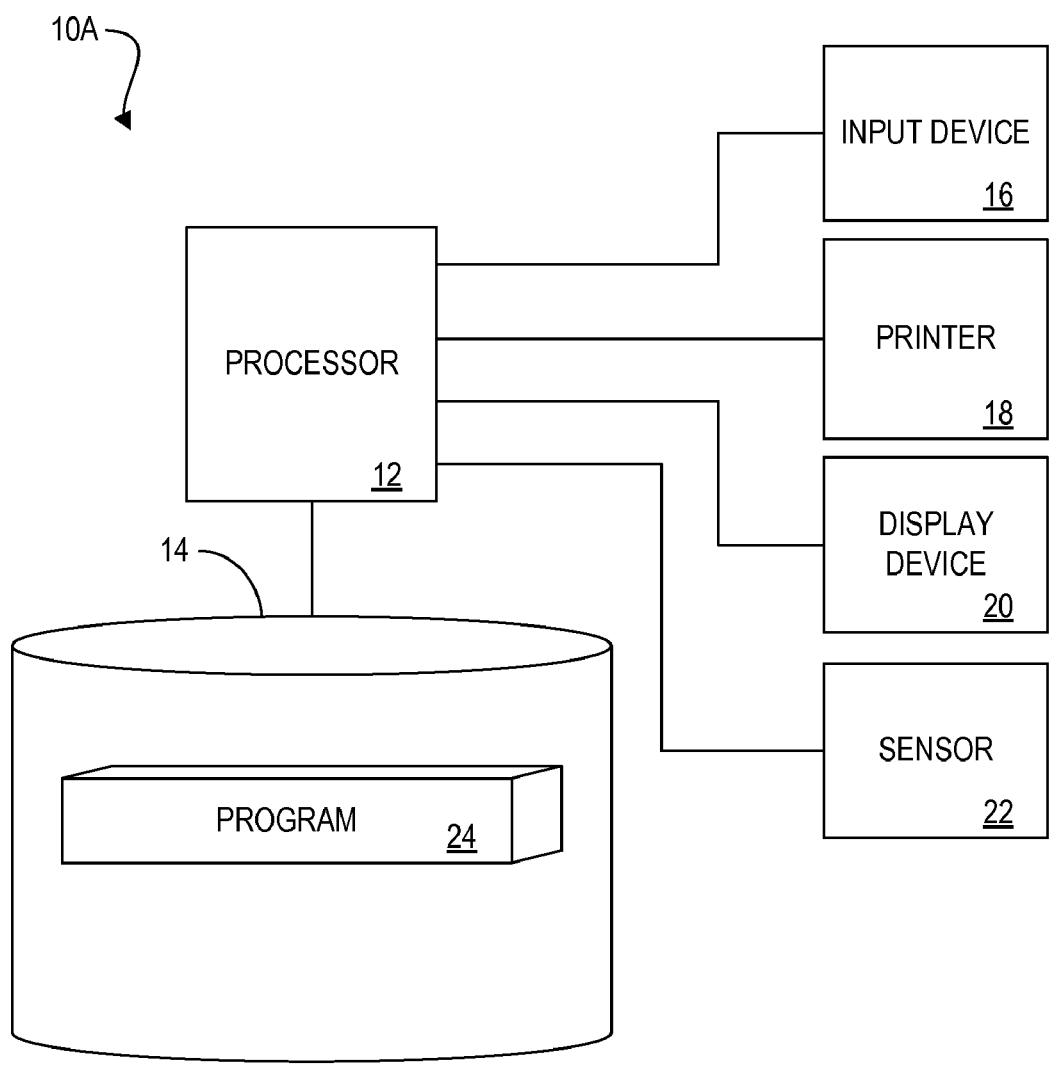
FIG. 1 is a schematic illustration of a POS terminal provided in accordance with the present invention.

Referring to FIG. 1, a POS terminal 10A, which may be the IBM 4683 or IBM 4693 manufactured by International Business Machines, comprises a processor 12, such as one or more conventional microprocessors. The processor 12 is in communication with a data storage device 14, such as an appropriate combination of magnetic, optical and/or semiconductor memory. The processor 12 and the storage device 14 may each be (i) located entirely within a single computer or other computing device; (ii) connected to each other by a remote communication medium, such as a serial port cable, telephone line or radio frequency transceiver; or (iii) a combination thereof. For example, the POS terminal 10 may comprise one or more computers which are connected to a remote server computer for maintaining databases.

An input device 16 preferably comprises a keypad for transmitting input signals, such as signals indicative of a purchase, to the processor 12. A printer 18 is for registering indicia on paper or other material, thereby printing receipts, coupons and vouchers as commanded by the processor 12. A display device 20 is preferably a video monitor for displaying at least alphanumeric characters to the customer and/or cashier. Many types of input devices, printers and display devices are known to those skilled in the art, and need not be described in detail herein. The input device 16, printer 18 and display device 20 are each in communication with the processor 12.

A sensor 22 is also in communication with the processor 12. The sensor 22 and processor 12 may be used to measure, for example, the number of customers entering a store or the number of customers in the vicinity of the POS terminal. Many other types of sensors are known and need not be described in detail herein.

The storage device 14 stores a program 24 for controlling the processor 12. The processor 12 performs instructions of the program 24, and thereby operates in accordance with the present invention, and particularly in accordance with the methods described in detail herein. The program 24 furthermore includes program elements that may be necessary, such as an operating system and "device drivers" for allowing the processor to interface with computer peripheral devices, such as the input device 16, the printer 18, the display device 20 and the sensor 22. Appropriate device drivers and other necessary program elements are known to those skilled in the art, and need not be described in detail herein.

Figure 2:
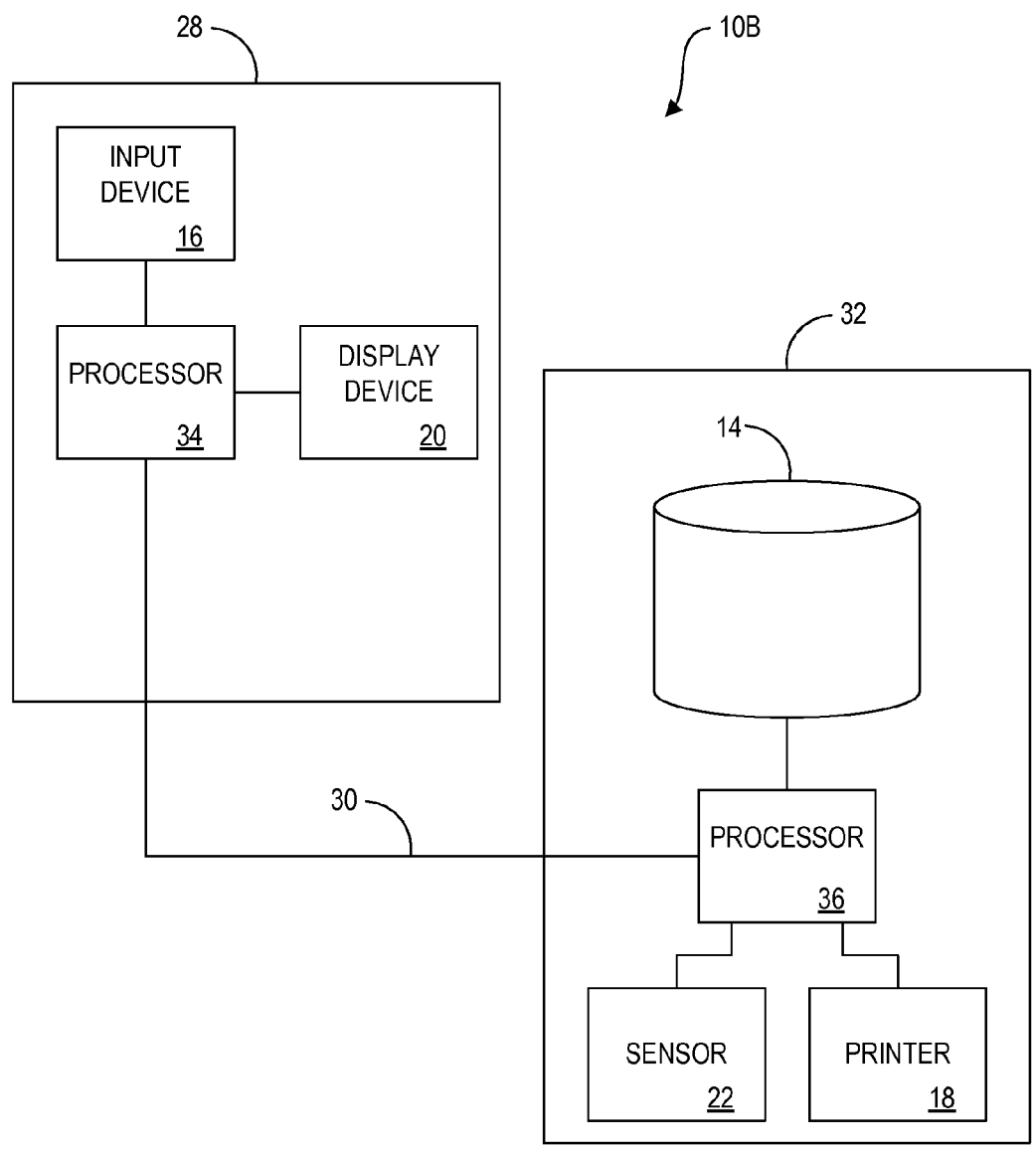
FIG. 2 is a schematic illustration of another embodiment of the POS terminal of FIG. 1.

FIG. 2 illustrates another embodiment 10B of the POS terminal of FIG. 1, in which a control device 28 is in communication via a communication medium 30 with a system 32 for providing a supplementary process. The control device 28 comprises a processor 34 in communication with the input device 16 and the display device 20. The system 32 for providing a supplementary process comprises a processor 36 in communication with the storage device 14, the printer 18 and the sensor 22. In this embodiment, the control device 28 may be a cash register, and the system 32 may be an electronic device connected thereto for printing coupons in accordance with data received from the cash register. Other configurations of the POS terminal 10 will be understood by those skilled in the art.

Figure 3:
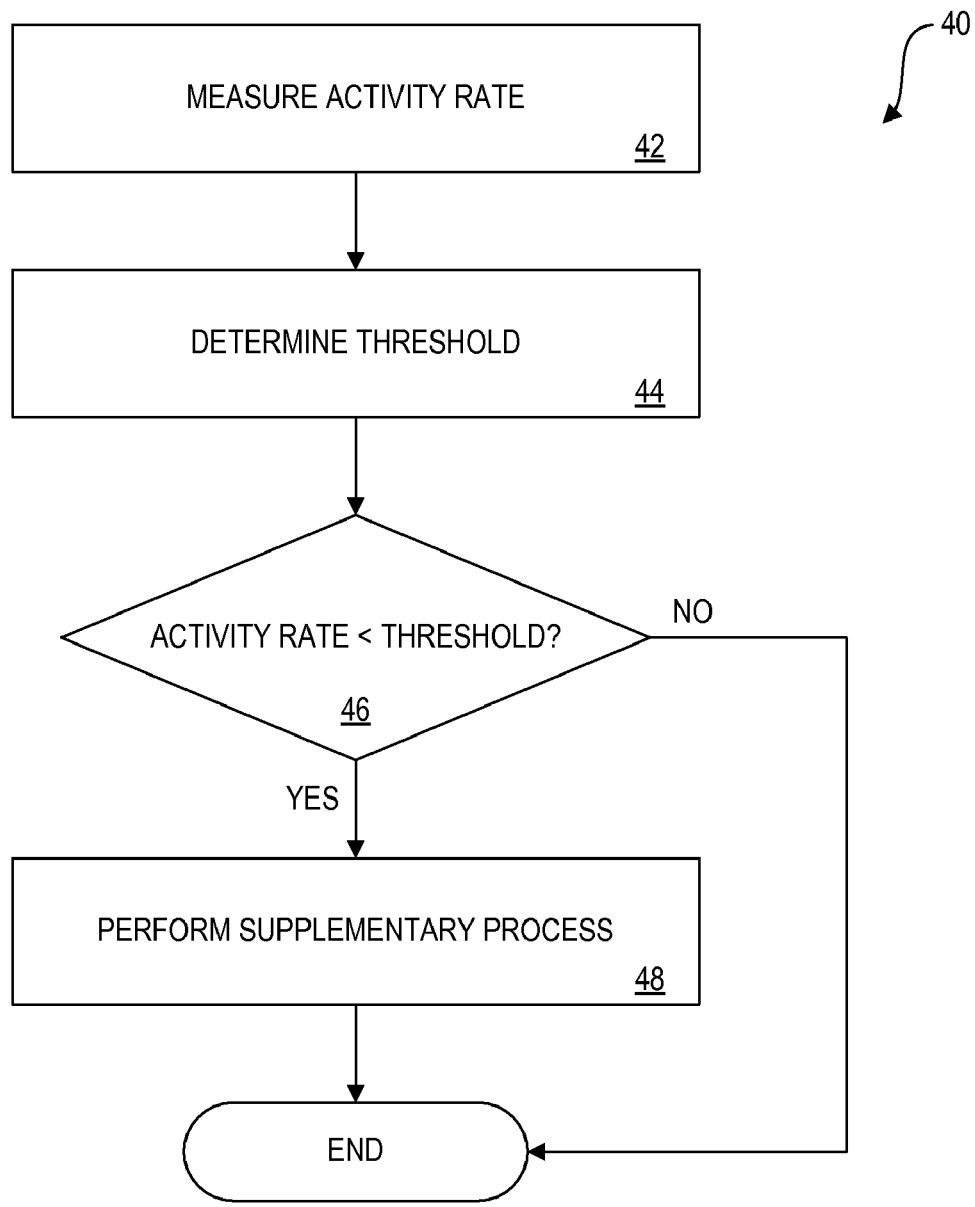
FIG. 3 is a flow chart illustrating a method provided in accordance with the present invention for controlling the performance of a supplementary process at a POS terminal.

Referring to FIG. 3, a method 40 for controlling the performance of a supplementary process initiates with the POS terminal of FIGS. 1 and 2 measuring one or more criteria, such as the activity rate of the POS terminal 10 (step 42). For example, the POS terminal may measure the number of completed transactions per time (transaction rate), the number of items purchased through the POS terminal 10 per period of time (item sale rate), or the number of upsells accepted by customers per period of time (upsell acceptance rate). The POS terminal may measure the number of customers, such as the number of customers in a store or the number of customers in the vicinity of the POS terminal, through input signals received from the sensor 22. Many other types of measurements may be made by the POS terminal.

The POS terminal then determines, based on the measured activity rate or other criteria, whether to perform a supplementary process, such as offering an upsell in exchange for change due. In one embodiment, the POS terminal compares the activity rate to a predetermined threshold. Such a threshold may be determined (step 44) in a number of ways. For example, the threshold may be a predetermined value (e.g. a rate of three transactions per minute), or a variable value (e.g., three transactions per minute after 5:00 PM, two transactions per minute otherwise). Many methods of calculating thresholds, based on many variables such as time of day and day of the week, will be understood by those skilled in the art.

Once the threshold is determined, the activity rate is compared to the predetermined threshold (step 46). One comparison is to determine whether the activity rate is less than the threshold. For example, the POS terminal may determine whether the measured number of completed transactions in the last ten minutes is less than a predetermined threshold of seven transactions per ten minute period.

If the comparison is valid, (e.g., the measured activity rate is less than the threshold), then the POS terminal performs the supplementary process (step 48). The POS terminal may perform the supplementary process by executing instructions of the program 24 (FIG. 1). Alternatively, the POS terminal may perform the supplementary process by sending control signals from the control device 28 (FIG. 2) to the system 32 for providing a supplementary process. In such an embodiment, the control device 28 determines whether to enable or disable the system 32. For example, the control device 28 may disable the system 32 if the activity rate is greater than a predetermined threshold, and enable the system 32 if the activity rate is less than the predetermined threshold. The control device 28 may enable and disable the system 32 by transmitting thereto appropriate enable signals and disable signals. Such signals may be control signals, which serve only to enable or disable the performance of the supplementary process, or may be data signals, which contain additional information for use by the system 32. Instead of separate enable and disable signals, the control device 28 may transmit to the system 32 a signal that toggles the system 32 between an enabled mode and a disabled mode.

It will be understood by those skilled in the art that the system 32 may alternatively be "enabled-until-disabled". In other words, the control device 28 would only need to transmit a disable signal when the supplementary process is not to be performed. When no disable signal is transmitted to the system 32, the system 32 would perform the supplementary process (even if no enable signal is received). Similarly, the system 32 may be "disabled-until-enabled". In other words, the control device 28 would only need to transmit an enable signal when the supplementary process is to be performed. When no enable signal is transmitted to the system 32, the system 32 would not perform the supplementary process (even is no disable signal is received).

As an illustration of the above-described method 40, the POS terminal may measure an activity rate, and determine if the activity rate is less than a predetermined threshold. If so, the POS terminal then determines an upsell in dependence on a purchase, as described in a parent application of the present application, U.S. patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997 and issued as U.S. Pat. No. 6,119,099 on Sep. 12, 2000. The POS terminal further determines an upsell price in dependence on the purchase, and offers the customer an upsell in exchange for the upsell price.

In the above-described embodiments, the POS terminal determines whether a supplementary process is or is not performed. In other embodiments, the POS terminal 10 may further select a supplementary process based on the measured activity rate or other criteria. For example, it may be desirable that different types of offers are provided to customers depending on the activity rate of the POS terminal. In particular, more time-consuming offers are provided when the measured activity rate is low, while quicker offers are provided when the measured activity rate is high.

FIG. 4 is a table 60 that illustrates an offer schedule, which may be implemented as a database stored on the storage device 14 in a manner well known in the art. Each row of the table 60 represents an entry, and each entry defines an upsell to offer for an activity rate. In particular, each entry includes an activity rate identifier 62 that uniquely identifies the entry, an activity rate 64 which describes a rate or range of rates, and an upsell to offer 66 at that activity rate. As described in patent application Ser. No. 08/920,116, the upsell to offer 66 may include two or more upsells which are offered one at a time until an upsell is accepted.

An entry 68, corresponding to activity rates less than eight transactions per fifteen-minute period, indicates that an additional product is to be offered during these (relatively low) activity rates. Additional product offers typically have low "offer speeds", since it may be several seconds for a cashier to retrieve the additional product if the offer is accepted by the customer. An entry 70, corresponding to activity rates between eight and fifteen transactions per fifteen-minute period, indicates that a "triple-your-change" coupon is to be offered during these activity rates. Typically, printing a coupon is quicker than offering an additional product. A coupon offer thus has a higher offer speed, which is why a coupon is to be offered during periods of higher terminal activity. An entry 72 indicates that no offer is to be provided at activity rates greater than fifteen transactions per fifteen-minute period.

The above embodiments describe how the POS terminal automatically controls the performance of a supplementary process. It may further be desirable to provide a method and apparatus to, at times, counteract such automatic control. Allowing a manual override of the decision of the POS terminal would provide even finer control over the performance of the supplementary process. For example, a store manager may wish to test the supplementary process, even though the POS terminal is not currently performing the supplementary process. In addition, there may be certain situations, which a device cannot accurately account for, in which a supplementary process should not be performed.

Figure 5:
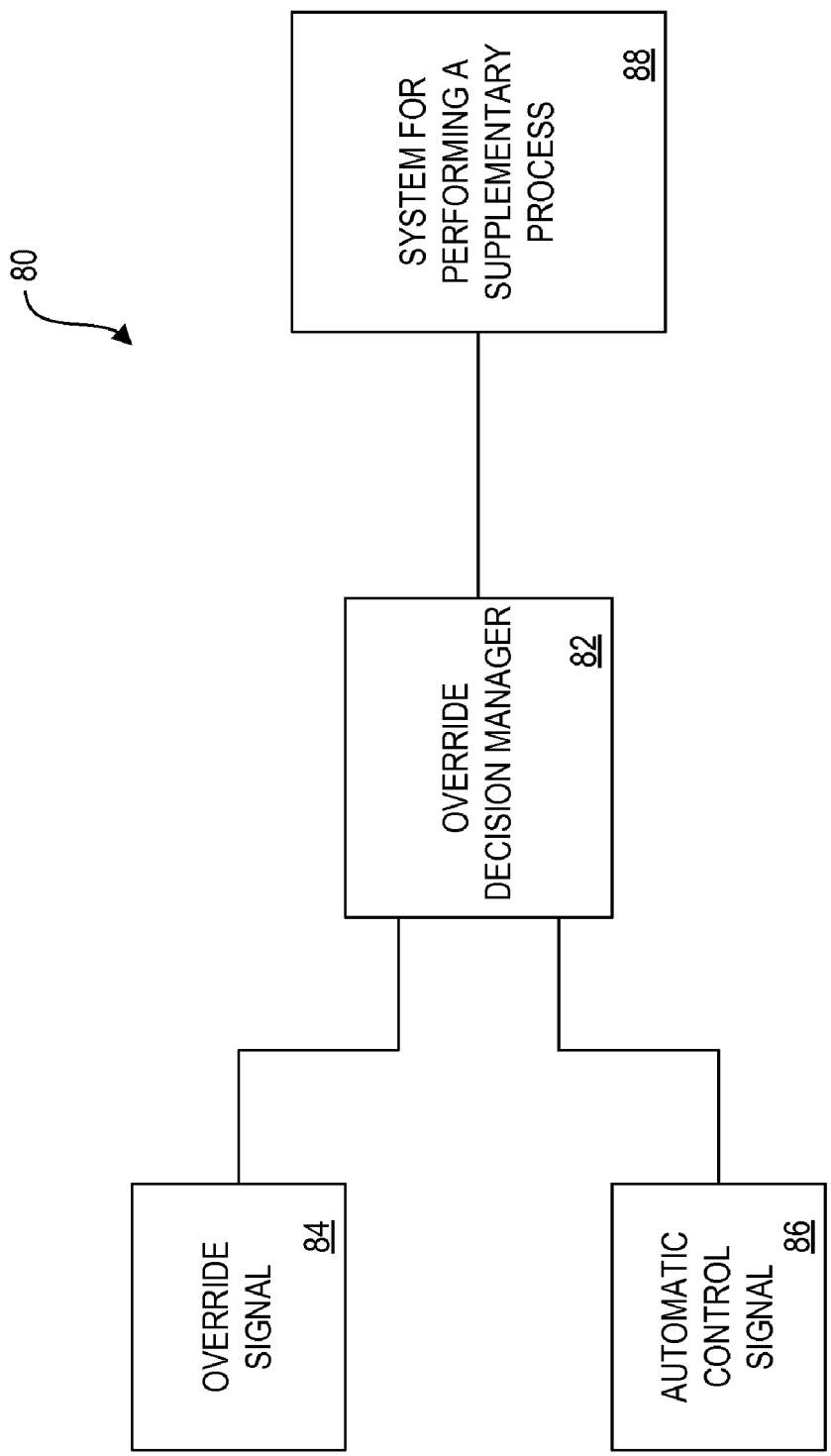
FIG. 5 is a schematic illustration of an override decision manager of the POS terminal of FIG. 2.

Referring to FIG. 5, an apparatus 80 includes an override decision manager 82 which receives input from an override signal circuit 84 and from an automatic control signal circuit

86. The override signal circuit 84 is a device that provides an override signal, such as a switch in communication with the POS terminal. The override signal circuit 84 may be one or more keys on the input device 16 (FIGS. 1 and 2), or may be another device that transmits and/or generates signals. The automatic control signal circuit 86 is the portion of the POS terminal that provides the control signal for controlling automatic performance of the supplementary process, as described above. The override decision manager 82 receives the override signal and control signal from circuits 84 and 86, respectively, and generates in dependence thereon an "enhanced control" signal for controlling performance of the supplementary process. The enhanced control signal is transmitted to a system 88 for performing a supplementary process. The system 88 may be a software module which is a component of the POS terminal 10A of FIG. 1, or may be the system 32 for providing a supplementary process of FIG. 2.

The override signal may be used to counteract the performance of the supplementary process that would have otherwise occurred in accordance with the control signal from the automatic control signal circuit 86. Referring to Table 1 below, the Truth Table shown describes the output (Enhanced Control Signal) as a function of the inputs (Override Signal and Control Signal). Table 1 describes an embodiment where the override signal may attain one of two values (i.e., 0 or 1). However, those skilled in the art will understand that the override signal may attain more than two values.

TABLE 1

Truth Table for Override Decision Manager

| Override Signal | Control Signal | Enhanced Control Signal |
|---|---|---|
| 0 | 0 | 0 |
| 0 | 1 | 1 |
| 1 | 0 | 0 |
| 1 | 1 | 0 | where:
Override Signal = 0 for Allowing Automatic Control
Override Signal = 1 for Disabling the Supplemental Process
Control Signal = 0 for Disabling the Supplemental Process
Control Signal = 1 for Enabling the Supplemental Process
Enhanced Control Signal = 0 for Disabling the Supplemental Process
Enhanced Control Signal = 1 for Enabling the Supplemental Process For example, when Override Signal=1 and Control Signal=1, then a user is overriding the automatic determination to enable the supplemental process. Accordingly, the Enhanced Control Signal=0, and the supplemental process is disabled.

Figure 6:
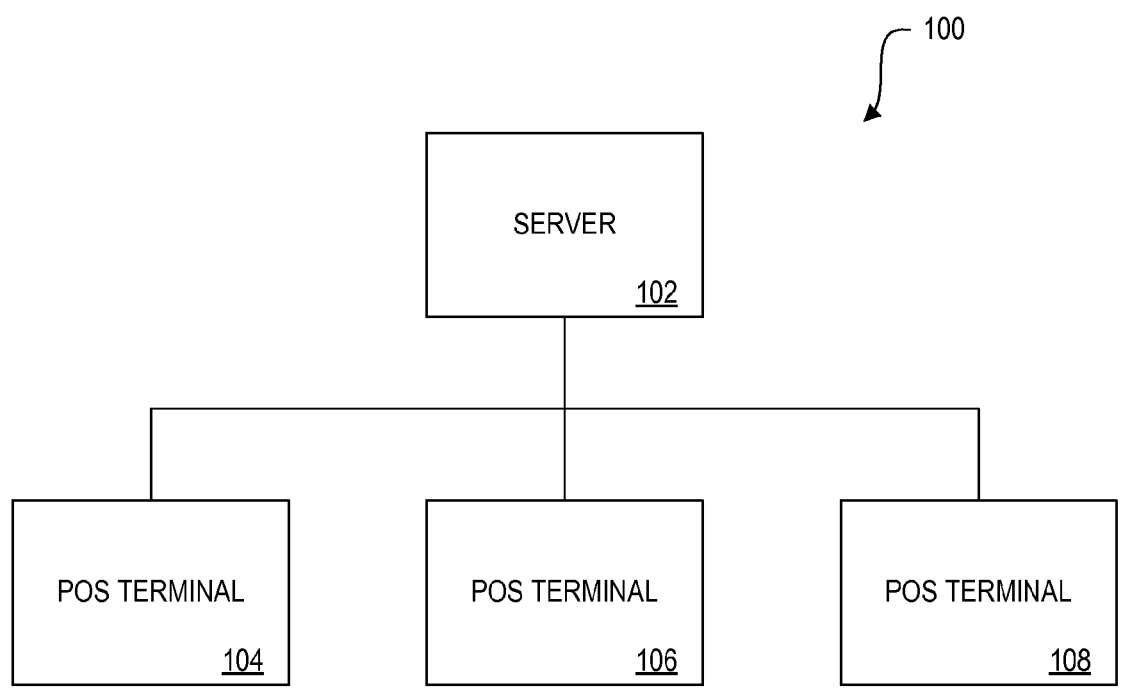
FIG. 6 is a schematic illustration of a network of POS terminals.

Referring to FIG. 6, a network 100 includes a server computer 102 in communication with POS terminals 104, 106 and 108. The server computer 102 may itself be a POS terminal, as described above. Although three POS terminals are shown in FIG. 6, any number of POS terminals may be in communication with the server computer 102 without departing from the spirit and scope of the present invention. The server computer 102 may perform many of the above-described processes, especially those processes which are performed for more than one POS terminal. For example, the server computer 102 may (i) measure the activity rate of any or all of the POS terminals 104, 106 and 108, (ii) determine whether to provide a supplementary process at any or all of the POS terminals 104, 106 and 108, (iii) enable or disable one or more systems for providing a supplementary process, and/or (iv) transmit an override signal to any or all of the POS terminals 104, 106 and 108. The server computer 102 may also collect data from the POS terminals 104, 106 and 108, thereby aggregating information about the processes that each POS terminal performs. For example, each POS terminal may measure its own activity rate, and transmit to the server computer 102 signals indicative of the measured activity rate. The server computer 102 may then determine an overall activity rate for the network 100 of POS terminals.

The measured activity rate may be, for example, the number of POS terminals in use (processing transactions) or the percentage of POS terminals in use. Based on the activity rate, the server computer 102 may determine whether to permit the supplementary process to be performed at each POS terminal. Alternatively, the server computer 102 may determine which of the POS terminals are to perform the supplementary process.

FIG. 7 shows a table 120 that illustrates an offer schedule for a network of POS terminals. Each row of the table 120 represents an entry, and each entry defines an upsell to offer for an activity rate. The activity rate used in the table 120 is based on which of a plurality of terminals are in use. Each entry includes an activity rate identifier 122 that uniquely identifies the entry, an activity rate 124 which describes a rate or range of rates, and an upsell to offer 126 at that activity rate. For example, the entry 128, corresponding to less than 50% of all POS terminals in use, indicates that three products are to be offered, and the customer is to choose one. The entries 130, 132 and 134 similarly describe upsells to be offered for different activity rates. As described above, more time-consuming upsells such as multiple upsells offered one after the other may be offered during periods of lower activity.

Although the present invention has been described with respect to a preferred embodiment thereof, those skilled in the art will note that various substitutions may be made to those embodiments described herein without departing from the spirit and scope of the present invention.

What is claimed is:

1. A method for controlling performance of a supplementary process at a point-of-sale terminal, comprising:
  receiving an override signal; and
  if the override signal indicates performance of a supplementary process,
    determining, by a point-of-sale terminal, an upsell in dependence on a purchase,
    determining, by the point-of-sale terminal, an upsell price in dependence on the purchase,
    offering to exchange the upsell price for the upsell,
    in which the upsell comprises an entry in a lottery in which a prize for winning the lottery is proportional to the upsell price, and
    outputting the entry.

2. The method of claim 1, further comprising:
  prior to receiving the override signal, disabling a system for providing the supplementary process.

3. The method of claim 2, further comprising:
  enabling the system for providing a supplementary process if the override signal indicates performance of the supplementary process.

4. An apparatus for controlling performance of a supplementary process at a point-of-sale terminal, comprising:
  a storage device; and
  a processor connected to the storage device,
  the storage device storing a program for controlling the processor; and
  the processor operative with the program to:
    receive an override signal; and
    if the override signal indicates performance of a supplementary process,
      determine an upsell in dependence on a purchase, determine an upsell price in dependence on the purchase, and offer to exchange the upsell price for the upsell, in which the upsell comprises an entry in a lottery in which a prize for winning the lottery is proportional to the upsell price, and outputting the entry.

5. The apparatus of claim 4, in which the processor is further operative with the program to:

prior to receiving the override signal, disable a system for providing the supplementary process.

6. The apparatus of claim 5, in which the processor is further operative with the program to:

enable the system for providing a supplementary process if the override signal indicates performance of the supplementary process.

7. A computer readable medium storing instructions configured to direct a computing device to:

receive an override signal; and if the override signal indicates performance of a supplementary process, determine an upsell in dependence on a purchase, determine an upsell price in dependence on the purchase, and offer to exchange the upsell price for the upsell, in which the upsell comprises an entry in a lottery in which a prize for winning the lottery is proportional to the upsell price, and outputting the entry.

8. The computer readable medium of claim 7, the instructions being further configured to direct the computing device to:

prior to receiving the override signal, disable a system for providing the supplementary process.

9. The computer readable medium of claim 8, the instructions being further configured to direct the computing device to:

enable the system for providing the supplementary process if the override signal indicates performance of the supplementary process.

\* \* \* \* \*